Patented Nov. 15, 1932

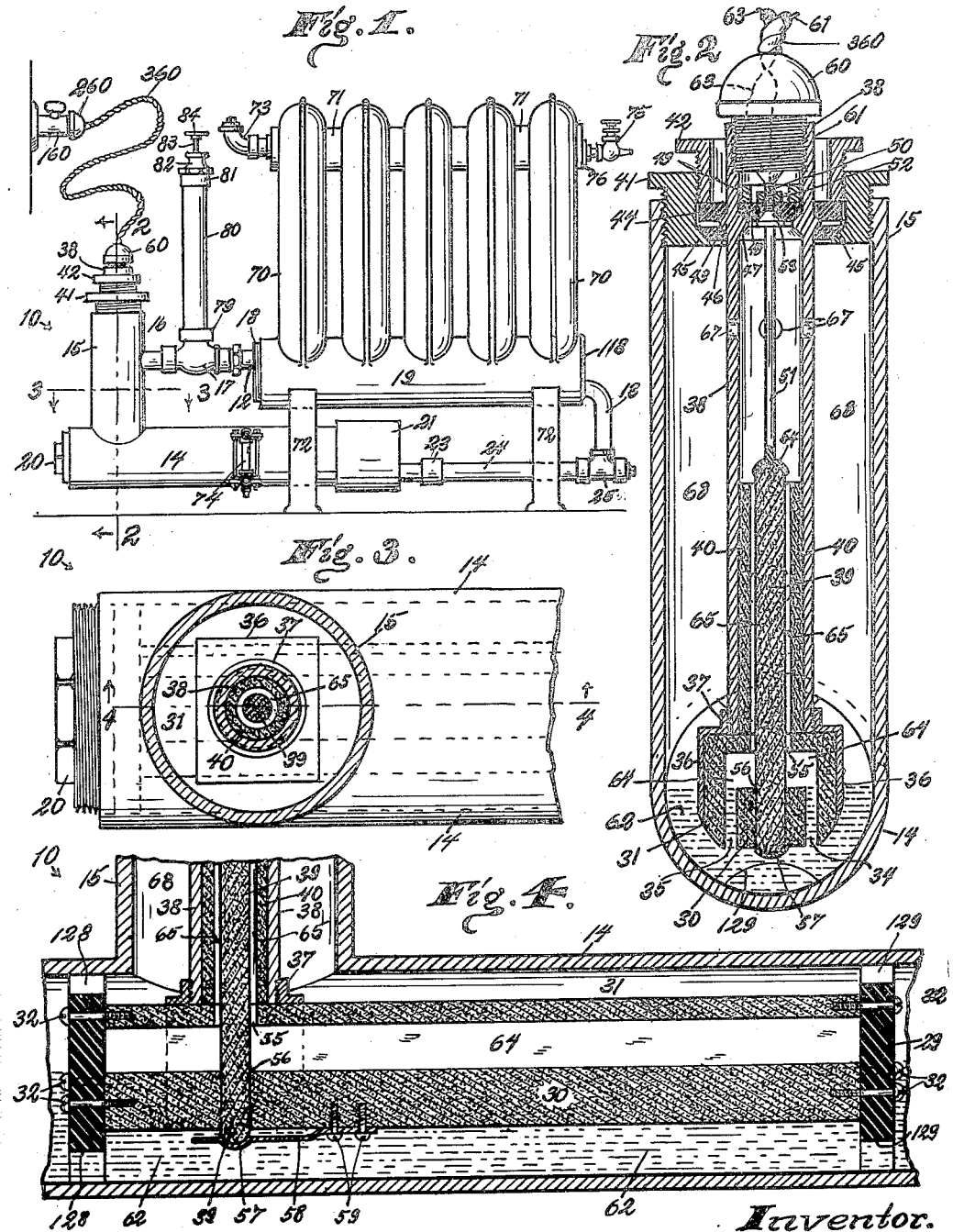

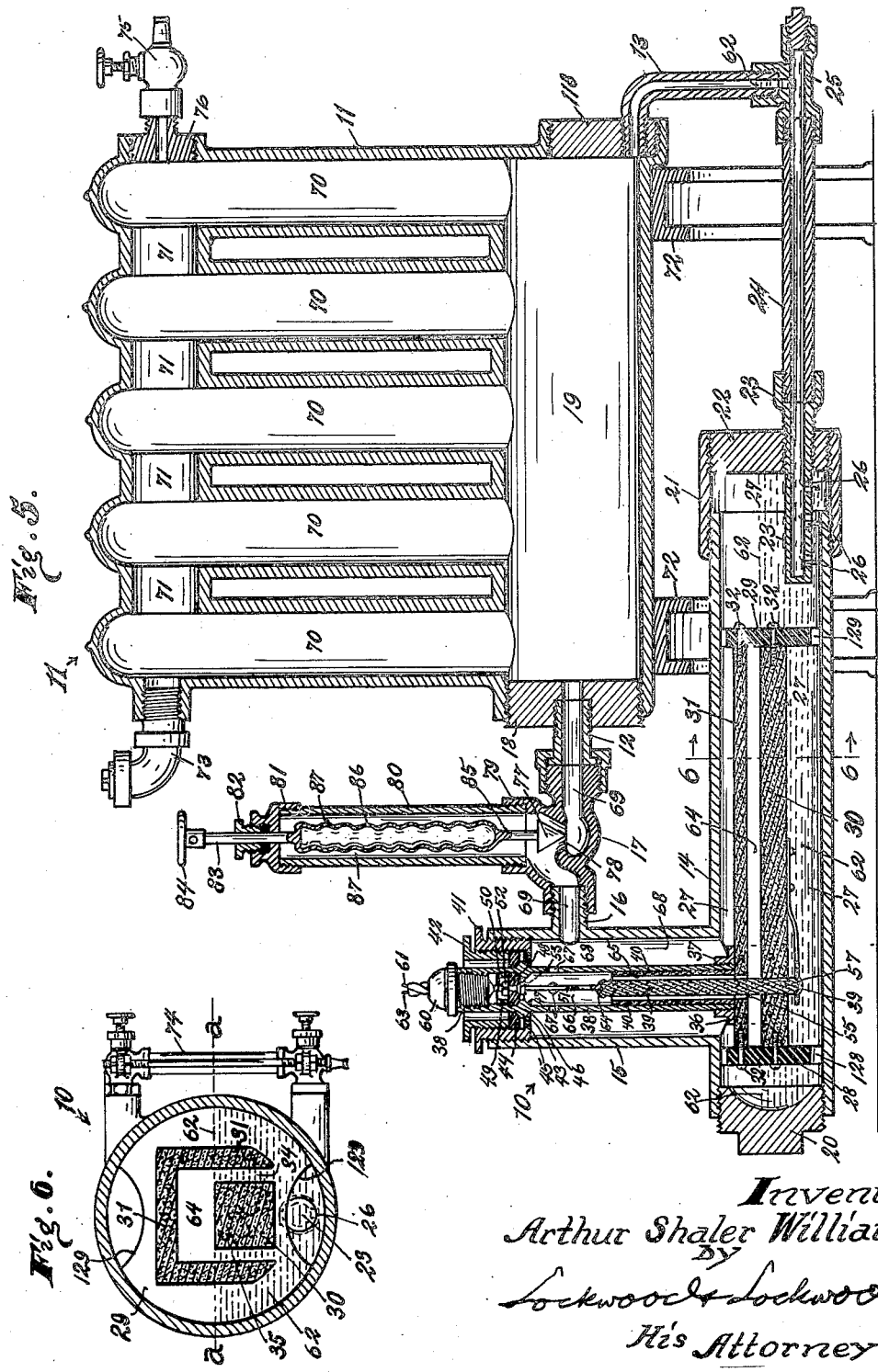

1,887,533

UNITED STATES PATENT OFFICE

ARTHUR SHALER WILLIAMS, OF ITHACA, NEW YORK

APPARATUS FOR DEVELOPING HEAT BY ELECTRICITY

Application filed August 8, 1930. Serial No. 473,839.

This invention relates to apparatus for developing heat by electricity and the principal object is to provide a simple means for a complete conversion of electrical energy into heat and its distribution in a liquid and its vapor by means of the resistance of the liquid to an electric current flowing through it between electrodes inert to electrolysis, and development of the heat of a catalytically induced chemical reunion of the elements of the liquid which have been separated by electrolysis.

In other words I provide a simple means whereby the entire energy of an electrical current is developed into heat as it passes from electrodes to electrodes through the liquid due to the resistance of the liquid to the current with other means arranged adjacent the electrodes for immediately and completely reuniting any elements of the liquid separated by electrolysis.

It is understood that in this means for developing heat only a small portion of the liquid is so effected by electrolysis as to cause a separation of the liquid elements and these separated elements are reunited by catalytical means. In other words if the liquid used is water, which is preferable, a small quantity of the water may be separated into oxygen and hydrogen by electrolysis and these elements are completely and immediately reunited by catalytical members arranged adjacent the electrodes, that are heated to a temperature sufficient to accomplish the reuniting of the oxygen and hydrogen.

Another object of the invention is to provide a simple automatic means for controlling the amount of electrical current flowing through the liquid between the electrodes, which means includes a construction, combination and arrangement of parts whereby the vapor pressure is utilized to vary the amount of liquid between the electrodes. In other words as the vapor pressure increases in the heater the amount of liquid between the electrodes decreases and vice versa.

Another object of the invention is to provide a simple and economical means for developing steam by electricity which is highly efficient and capable of being accomplished by simple, safe, practical and inexpensive apparatus in units of convenient size for locating a heat source where and when it is most needed. In other words, I provide a simple means whereby complete independent and economical heating units may be located with the extensive flexibility of electric wiring.

A feature of invention is shown in the means for automatically controlling the heat development that includes an adjustable thermostat valve for controlling the vapor pressure differential which in turn varies the amount of liquid between the electrodes.

Another feature of invention is shown in the use of a chemically inert catalyst kept within the range of the greatest activity by heating due to its resistance to the electric current passing through it. In other words the catalyst is so located that all of the electrolytically developed gases must pass it in a thin cylindrical flowing vaporous stream, in which passing the gases are reunited into their natural state before entering metallic passages.

Other objects, advantages and features of invention may appear from the accompanying drawings, the subjoined detailed description and the appended claims.

The accompanying drawings illustrate the invention, in which:

Fig. 1 is a side view of the radiator with an apparatus for developing heat by electricity connected to the radiator that is constructed in accordance with this invention.

Fig. 2 is an enlarged central vertical section on the line 2—2 of Fig. 1, showing the construction and arrangement of the parts of my apparatus for a complete conversion of electrical energy into heat.

Fig. 3 is an enlarged fragmental cross section on line 3—3, Fig. 1.

Fig. 4 is an enlarged fragmental central longitudinal section on line 4—4, Fig. 3, showing the detailed construction and arrangement of the carbon electrodes relative to the catalytic members of the apparatus.

Fig. 5 is a central longitudinal section through the apparatus showing it attached to a radiator also shown in section.

Fig. 6 is an enlarged cross section on the line 6—6, Fig. 5, showing the detailed construction of the carbon electrodes and their arrangement in the water chamber of the apparatus.

The apparatus for developing heat by electricity is shown in the drawings connected to an ordinary radiator for the purpose of illustration, it being understood that the apparatus can be adapted to develop heat wherever it is to be used.

The apparatus includes a heater 10 that is connected to a radiator 11 by an inlet pipe 12 and outlet pipe 13. The heater 10 includes a heating cylinder 14 having a standpipe 15 that has a pipe extension 16 connected by the valve housing 17 to the pipe 12 that is secured in a plug 18 that closes one end of the radiator chamber 19. The other end of the chamber 19 is closed by a plug 118 into which one end of the outlet pipe 13 is connected.

The heating cylinder 14 has one of its ends closed by a plug 20 and the other end is provided with an extension sleeve 21 that is provided with a plug 22 through which the nozzle 23 is extended and secured and the nozzle is connected by a pipe 24 and coupling 25 to the pipe 13.

The nozzle 23 is provided with downwardly extending outlets 26 that discharge water into the bottom of the chamber 27 in the cylinder 14 when it is flowing from the chamber 19.

Insulating blocks 28, 29 are arranged adjacent the ends of the chamber 27 that carry the carbon electrodes 30, 31 that are secured to the blocks by screws 32. The electrode 30 is in the form of a square bar and the other electrode is in the form of an inverted trough arranged over the electrode 30. These electrodes are arranged so that there is a space of a predetermined distance between the center electrode 30 and the sides of the trough electrode 31; and also so that when the chamber 27 is half filled with a liquid, preferably water, the center electrode will be covered to its top edges with the spaces 34, 35 between its sides and the sides of the trough fully filled with the water that form conductors for an electric current from electrode to electrode.

A forked support 36 having a threaded socket 37 is secured on the bottom and to the sides of the inverted trough-like electrode 31, and secured in the socket 37 and extending centrally and upwardly through the standpipe 15 is the tubular housing 38 in which the catalytic members 39, 40, made preferably of silica carbide, platinum, carbon or carbide, are secured.

The upper end of the standpipe 15 is closed by screw plugs 41, 42 and the insulating disks 43 and 44 that also form an airtight closure around the upper outer end of the tubular housing 38. The plug 41 is provided with an inwardly extending beveled flange 45 against which the beveled side of the disk 43 is forced by an annular beveled exterior bead 46 integral with the housing 38, and the disk 44 is held seated on the bead 46 by the plug 42.

An annular beveled bead 47 is integral with the housing 38 and arranged opposite the bead 46 and on this bead a disk 48 is held seated by a plug 49.

A threaded stem 50 of a hanging bar 51 is extended through a centrally arranged hole in the disk 48 so that by means of a nut 52 the beveled shoulder 53 of the bar 51 can be drawn tightly into a beveled enlargement of the hole through the disk to make an airtight fit in the upper end of the housing 38.

An inverted cup 54 is arranged at the lower end of the hanging bar 51 in which the upper end of the catalytic member 39 is extended; and the lower end portion of this member is also extended through a hole 55 in the electrode 31 and also a hole 56 in the electrode 30 and has its lower end seated in a cup 57 that is integral with a spring 58 secured by screws 59 to the bottom of the electrode 30, and these cups are arranged to hold the catalytic member 39 vertically and centrally in the housing 38, see Figs. 2 and 4.

The foregoing parts of the heater 10 are arranged so that when an electric plug 60 is fitted into the upper end of the housing 38 to contact with the threaded stem 50 current from the wire 61 will pass through the parts 51, 54, 39 to the center electrode 30, it being understood that the plug 60 is connected in the usual way to a wall socket 160 by plug 260 and cord 360, as diagrammatically shown in Fig. 1, so that an electric current of sufficient voltage to properly heat the catalytic members 39, 40 can be supplied to the heater when these parts are properly connected.

From the electrode the current will pass through the water 62 in the spaces 34, 35 between the electrodes or from electrode 30 to the electrode 31 and then through the housing 38 back to wire 63 leading from the plug 60.

In other words an electric circuit is established between the electrodes 30—31 through the water 62 which, due to its resistance to the electric current, develops heat that converts the water into steam which, rising from the chamber 64, passes out of the opening 55 up through a relatively small cylindrical passage 65 between the heated catalytic members 39, 40 where a chemical reunion of the relatively small quantity of hydrogen and oxygen separated by electrolysis is accomplished.

It is understood that the catalytic members 39, 40 in operation are heated to a temperature sufficient to effect a relatively complete reunion of the hydrogen and oxygen before they can pass on into the radiator chamber.

The electrode 31 is secured to the blocks 28, 29 so that a chamber 64 is formed above the top surface of the electrode 30 and also above the top of the water 62 between the sides of the electrodes so that when steam is developed in this chamber it must pass out of the chamber 64 through the hole 55 and thence through the cylindrical passage 65 into a chamber 66 above the catalytic members 39, 40. From the chamber 66 the steam passes through ports 67 into a chamber 68 surrounding the housing 38, and from chamber 68 the steam can pass through passage 69 to the chamber 19 of the radiator. After entering the chamber 19 the steam can circulate through the vertical and top passages 70, 71 to heat the radiator.

The electrodes 30, 31 are arranged in the chamber 27 so that there is no danger of the electrical current short circuiting to the wall of the heater as the distance between the sides of the electrodes is very much less than the distance from any exterior point on the electrodes to the wall of the heater. Also these electrodes, as previously indicated, are inert to electrolysis, and the very small portion of the liquid affected by electrolysis has its elements reunited by the catalytic action of members 39, 40 between which the steam and gases must pass.

The catalytic member 39 is an elongated solid cylinder having its lower end portion extending down through both of the electrodes so that the steam and gases must pass upward around it in a thin cylindrical flowing volume. The catalytic member 40 is a hollow cylinder having its lower end resting on the electrode 31 and its inner diameter is slightly greater than the outer diameter of the member 39 so as to form a long cylindrical space between them for the purpose stated.

As previously indicated, the elements of the liquid separated by electrolysis will be reunited as they flow upward between these catalytic members that are heated to a temperature sufficient to effect the reuniting of the oxygen and hydrogen.

The end blocks 28, 29 are cut away at 128, 129 so that the water can circulate under the electrodes 30, 31 and the steam circulate above them.

The radiator is mounted on the usual supports 72 and at its forward end adjacent the top is provided with a fluid inlet 73 through which liquid can be passed when necessary to fill the heater 10 to a level even with the top surface of the electrode 30. This level is indicated in Fig. 6 by the line a—a and I provide the usual gauges 74 to indicate when the heater is properly filled.

Also I provide a safety valve 75 on a screw plug 76 at the rear end of the radiator adjacent its top end for the purpose of preventing an over-pressure of steam in the radiator. It is understood that any suitable safety valve may be used.

I provide a thermostat controlled valve 77 for regulating the flow of steam from the heater 10 to the radiator 11 and which also controls the amount of water through which the electric current can flow from electrode to electrode.

The valve 77 is supported so as to be moved toward or away from a valve seat 78 in the valve housing 17 so as to decrease or increase the flow of steam through the passage 69, it being understood that this valve is normally held open and is adjustable to a proper position by means that will be described later. The valve housing 17 is provided with an upwardly extending threaded socket 79 in which the lower end of a vertical cylinder 80 is secured, and secured to the upper end of this cylinder is a cap 81 and packing 82 through which a threaded stem 83 is adjustable by the knob 84 to properly arrange the valve 77 relative to the valve seat 78, as previously indicated.

Interposed between the lower end of the screw stem 83 and a stem 85 on the valve 77 is the thermostatic member 86 that is adapted to expand and contract as the temperature in the chamber 87 varies; and this temperature is governed by the steam circulating upwardly from the passage 69.

When the steam rises in temperature the member 86 expands and moves the valve 77 toward a closed position, thereby causing the pressure in the heater to exceed the pressure in the radiator, which excess pressure causes the water in the heater to flow through the nozzle 23, and pipes 24, 13 into the radiator. This movement of the water causes its level in the chamber 27 to lower, which reduces the flow of electric current from electrode to electrode and correspondingly reduces the development of heat.

When the flow of electric current is reduced the temperature in the chamber 87 will fall and the member 86 contract to again move the valve 77 to an open position. In other words when the steam pressure increases in the heater chamber the water will be automatically lowered between the electrodes to reduce the flow of electric current, and when the steam pressure in this chamber is lowered by a reduction in the development of heat the water will again rise between the electrodes to increase the heat.

By means of this adjustable thermostatic controlled valve 77 and the construction, combination and arrangement of parts associated with it, an apparatus is provided in which a most simple and flexible rheostatic variation of heating current through a 100% range is effected that can be controlled to a nicety in relation to a demand.

Thus an electrically operated heating system is provided well suited for heating homes, schools, offices, industrial plants, ships and the like, which does not consume the oxygen of the air or reduce the amount of oxygen therein for human consumption, or contaminate the air with gases detrimental to human life.

This system also enables one to employ radiators and gain the maximum vertical heating surface so that thermic circulation will bring large quantities of air in direct contact with the heated surface. This system avoids the dangers and disadvantages of the direct electric heater and greatly increases the heating ability of the system, as the best of our electric heating surfaces to date convert the majority of the electrical energy into radiant heat and, therefore, are very inefficient.

Said new system of heating has other advantages some of which are that it results in a 100% conversion of the electrical energy into heat, by the combination of internal heating of the liquid due to its resistance of current flowing through it between electrodes, and the reversal of electrolytic chemical composition changes into heat development by means of catalytic agents. The current variation and heat development are controlled by means of the pressure differential control of the degree of submersion of the electrodes. There is thermostatic control of the pressure differential which in turn controls submersion of the electrodes and electrical current flow.

That the use of electrodes in such electro-thermal conversion are inert to chemical union with products of electrolysis is an important characteristic, and also such use of electrodes in electro-thermic conversion which have a catalytic effect in reversing or converting electrolytic chemical composition changes in the heat development.

The invention is broader than the details herein and it is not limited to said details. The radiator is not limited to any particular form of hollow metal structure for receiving heated fluid and conducting the heat therein to the surrounding atmosphere. By "liquid" is meant water and other liquid capable of use in such heater. By "fluid" is meant liquid, steam and gas that flow. By "submergence" is meant wholly or largely surrounded by liquid. The heating or liquid chamber may be located anywhere so long as liquid returns from the radiator to it and the steam from it enters the radiator.

I claim as my invention:

1. In apparatus for developing heat by electricity, a steam heater having a heating chamber adapted to hold water, electric means therein for heating the water and developing steam, and catalytic means including inner and outer cylinders for forming a cylindrical passage for the steam for reuniting the hydrogen and oxygen which may be separated in the heater by electrolysis, said inner catalytic cylinder being connected in series with the electrical circuit to the water.

2. In an apparatus for developing heat by electricity, the combination with a radiator, of a heater having a liquid chamber connected therewith and adapted to receive liquid therefrom, separated electrodes in said chamber adapted when submerged by the liquid to pass electric current through the liquid and produce heated fluid for the radiator, and catalytic members arranged adjacent said electrodes between which the heated fluid must pass after being generated and through one of which electric current is supplied to one of said electrodes.

3. In an apparatus for developing heat by electricity, the combination with a radiator, of a metal cylinder having a chamber adapted to receive the liquid from the radiator, an inverted trough-shaped electrode arranged in said chamber, a bar-like central electrode arranged with said trough-shaped electrode and insulated therefrom at its ends, catalytic members arranged adjacent said electrodes, and means for supplying current to the central electrode through one of said catalytic members.

4. In an apparatus for developing heat by electricity, the combination with a radiator, of means for supplying heated steam therefor by passing an electric current through water, a hollow cylindrical catalytic member through which the steam passes to the radiator, a solid cylindrical catalytic member arranged centrally in said cylindrical member with a cylindrical space between them through which the steam and gases must pass for converting any accumulation of oxygen and hydrogen into steam and means whereby the solid cylindrical catalytic member is connected in series with the carbon electrode and water circuit so it is heated to a catalytic activity which will reunite free oxygen and hydrogen into a steam with the corresponding development of heat.

5. In an apparatus for developing heat by electricity, the combination with a radiator, of a heater having a chamber adapted to receive water from the radiator, electrode means in said chamber for causing the passage of electric current through the water, and a catalytic agent arranged adjacent and in contact with said electrode means for converting any accumulation of oxygen and hydrogen into steam before they enter the radiator.

6. In an apparatus for developing heat by electricity, the combination with a radiator, of a heater having a chamber adapted to receive water from the radiator, carbon electrode means in said chamber for causing the passage of electric current through the water and catalytic means engaging said electrode means for reuniting oxygen and hydrogen into water that may be formed by electrolysis before they enter the radiator.

7. In an apparatus for developing heat by electricity, the combination with a radiator, of a heater having a chamber adapted to receive water from the radiator, carbon electrode means in said chamber for causing the passage of electric current through the liquid, and a catalytic means including cylinders arranged one within the other and engaging said electrode means for converting any accumulation of oxygen and hydrogen into steam before they enter the radiator.

8. In an apparatus for developing heat by electricity, the combination with a radiator, of a metal heater having a chamber adapted to receive the water from the radiator, an inverted trough-like carbon electrode centrally in said chamber, a bar electrode arranged within said trough-like electrode and insulated at its ends therefrom, means for supplying current to the bar so it will pass through the water to the trough-like electrode and convert a portion of the water into steam, means whereby the steam can pass into said radiator, a thermo-static valve for controlling the passage from said heater to said radiator, a hollow cylindrical catalytic member having its lower end engaging said trough-like electrode, a solid cylindrical catalytic member arranged centrally within said hollow member and extended down through said trough-like electrode into engagement with said bar electrode, said catalytic members arranged to reunite the oxygen and hydrogen that are separated by electrolysis before these elements pass into the radiator.

9. An apparatus for developing heat by electricity including a heater having a chamber therein adapted to receive a quantity of liquid through which an electrical current is passed, an inverted trough-like electrode partly submerged in the liquid and having a vertical passage therethrough, a bar-like electrode arranged within said inverted trough-like electrode and insulated and spaced therefrom and submerged in the liquid, a solid cylindrical catalytic member extended through said vertical passage into contact with said bar-like electrode, a hollow cylindrical catalytic member enclosing said solid cylindrical catalytic member and spaced therefrom and having one end engaging said trough-like electrode so that said solid cylindrical catalytic member, bar-like electrode, liquid and trough-like electrode in the order named form the heat producing portion of an electric circuit.

In witness whereof, I have hereunto affixed my signature.

ARTHUR SHALER WILLIAMS.